Nov. 24, 1970    J. R. WELBORN    3,541,758
BALING APPARATUS
Filed Dec. 21, 1967    3 Sheets-Sheet 1
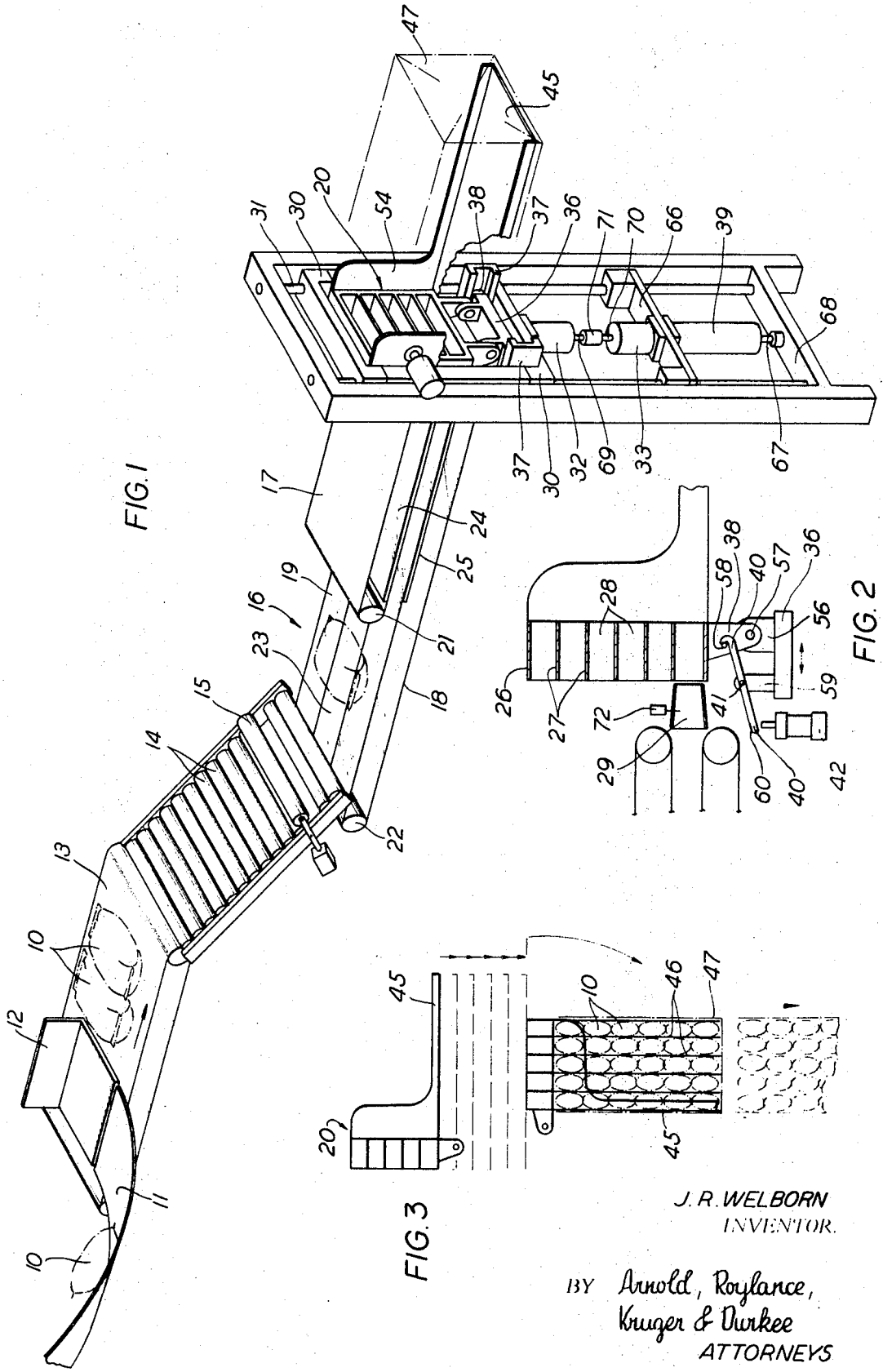
J. R. WELBORN
INVENTOR.
BY Arnold, Roylance,
Kruger & Durkee
ATTORNEYS Nov. 24, 1970   J. R. WELBORN   3,541,758
BALING APPARATUS
Filed Dec. 21, 1967   3 Sheets-Sheet 2
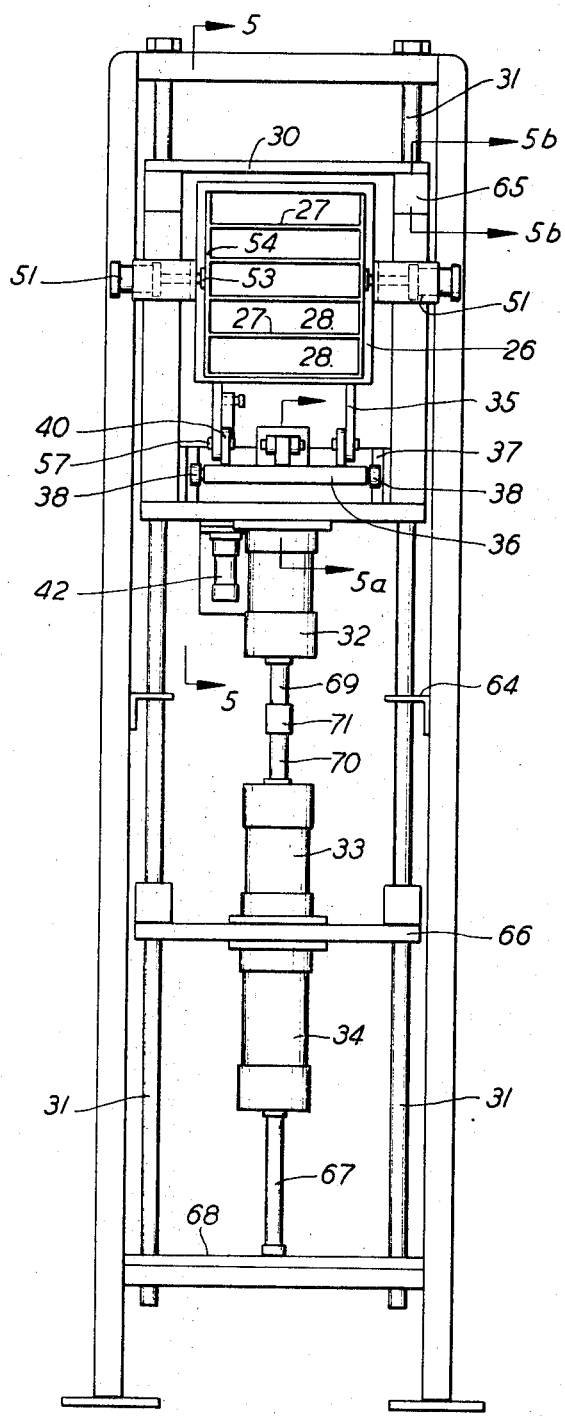
FIG. 4
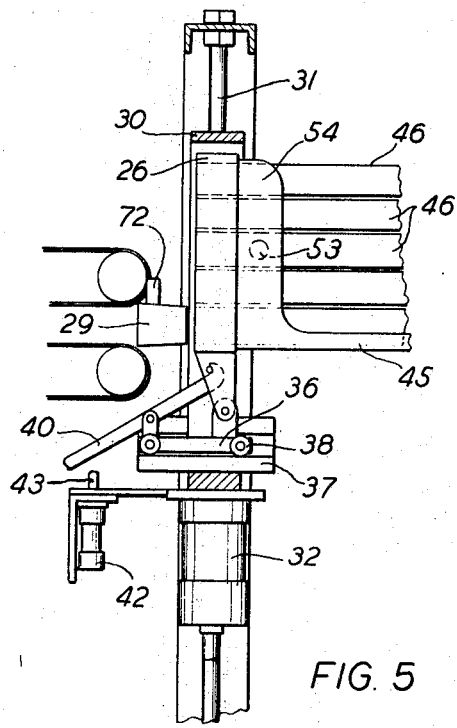
FIG. 5
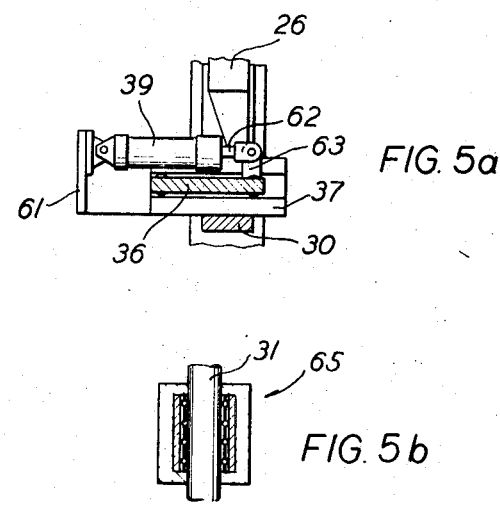
FIG. 5a
FIG. 5b
J. R. WELBORN
INVENTOR.
BY Arnold, Roylance,
Kruger & Durkee
ATTORNEYS Nov. 24, 1970  J. R. WELBORN  3,541,758
BALING APPARATUS Filed Dec. 21, 1967  3 Sheets-Sheet 3

J. R. WELBORN
INVENTOR.

BY Arnold, Roylance,
Kruger & Durkee
ATTORNEYS

United States Patent Office 3,541,758
Patented Nov. 24, 1970

3,541,758
BALING APPARATUS
Jimmie Ray Welborn, Beaumont, Tex., assignor to J & J
Manufacturing Company, a wholly owned subsidiary of
J. & J. Industries, Inc., Beaumont, Tex., a corporation
of Texas
Filed Dec. 21, 1967, Ser. No. 692,351
Int. Cl. B65b 57/10, 35/50, 39/06
U.S. Cl. 53—62                                10 Claims

ABSTRACT OF THE DISCLOSURE

This application discloses apparatus for packaging articles in bales of a plurality of layers, particularly articles such as sacks of pulverulent material such as rice. A hopper is used, which has a number of slots corresponding to the desired number of layers, and the articles are fed into one side of the hopper as by a conveyor to fill the bale positioned on the other side. The hopper is indexed downward when each layer is full, and when the bale is full the hopper rotates 90° to a horizontal position to release the bale. The motive power for these operations is provided by air cylinders, and these air cylinders also function to move the hopper back up out of the way so that the filled bale may be removed. The conveyor feeding articles into the hopper also functions to compress the sacks and form them into the desired shape for baling. Unique bag straightening arrangements are employed in the feed assembly for the compressor conveyor.

---

This invention relates generally to accumulating and bundling or baling flexible plastic bags of the type containing a product such as milled rice or the like. The features of the invention, however, are applicable to packaging other articles of this nature, or to material handling in general.

Milled rice is ordinarily packaged in paperboard cartons or in bags composed of cellophane, burlap, paper, or polyethylene. At present, the paperboard carton offers the most economical overall packaging costs, in spite of the higher costs of the carton itself, because of the fact that automatic packaging machinery is available which is capable of handling these cartons. Polyethylene bags would be preferable because of their lower initial costs and moisture proof qualities, as well as greater strength and more pleasing appearance. The disadvantage of bagging rice or like products in polyethylene bags is that the bags must be hand packed in large cartons or bales for bulk shipment. Usually the rice is packaged in two pound containers and about two or three dozen of these would be placed in a large bale or carton. If packaged in small paperboard cartons, the large bales may be made up by automatic machinery, but if packaged in polyethylene bags, hand packaging is necessary which adds considerably to the overall costs.

It is therefore the primary feature of the present invention to provide techniques for automatically and mechanically bundling small flexible bags of material into larger bales or boxes, the invention being particularly useful in automatically counting and packaging consumer-sized polyethylene bags of rice into paper baler bags or boxes. Another feature is the automatic handling of objects such as small flexible bags with a minimum of direct manual labor, the handling mechanism being adaptable for operating upon objects of various sizes and containing various materials, particularly bags or sacks of fluent material whereby the filled sacks readily deform or bend.

In accordance with the invention, apparatus is provided for accumulating the bags in a set number of layers with a certain number of bags in each layer. Basically this apparatus consists of a hopper defining a number of vertically-spaced horizontal slots or apertures corresponding to the desired number of layers. The bags are delivered into the apertures in sequence, with the hopper being indexed when the desired number of bags has been placed in each layer. A baler bag is positioned over the hopper to receive the bags, and when all of the layers are full, the hopper is arranged to pivot about one end and fall down to a position such that the baler bag is generally vertical and all of the layers of plastic bags are deposited into the bale. The filled baler bag is cleared by the hopper mechanism so that the bale may be removed.

In the preferred form of the invention, the apparatus for delivering the plastic sacks to the hopper includes a compressor conveyor which assures that the height and length of each bag conforms to the desired shape in the bale, with a bag guide positioned between the output of the compression conveyor and the slot of the hopper to further shape and guide the plastic sacks. In indexing the hopper with respect to the bag guide to fill the various layers, the hopper is moved away from the bag guide while being moved up or down, so that bags partially protruding from the hopper or from the bag guide will not be torn. A counter arrangement determines the passage of the correct number of bags through the bag guide for each layer.

In order to straighten and properly align the flexible sacks being fed into the compression conveyor, a bag transfer chute is provided which includes a pivoted stop cradle or table which receives the bags and pivots to lay the bags onto a conveyor in a generally aligned condition with the end of a bag being at a particular point on the conveyor. Transverse alignment of the bags is also assured by a bag strightener device which arrests the first one of series of bags stack up against one another until sufficient weight is present to depress the arrester. The bags thus straighten themselves in a transverse direction with respect to the conveyor.

Novel features which are believed characteristic of the invention are set forth in the appended claims. The invention itself, however, as well as further features and advantages thereof, may best be understood by reference to the following detailed description of particular embodiments when read in conjunction with the accompanying drawings, wherein:

FIG. 1 is a pictorial view of packaging apparatus according to one embodiment of the invention;

FIG. 2 is an elevation view in schematic form of the hopper portion of the apparatus of FIG. 2, shown as if in section;

FIG. 3 is a schematic illustration of the hopper portion of the apparatus of FIG. 1 showing a portion of the operating sequence;

FIG. 4 is an elevation view of the apparatus of FIG. 1 according to the invention, taken fro mthe front facing the hopper;

FIG. 5 is an elevation view of the apparatus of FIGS. 1 and 4, taken along the line 5—5 in FIG. 4;

FIG. 5a is a detail view of the operating mechanism for the travel car in the apparatus of FIGS. 4 and 5, taken along the line 5a—5a in FIG. 4;

FIG. 5b is a detail view of one of the bearing assemblies used for the frame, taken along a line 5b—5b in FIG. 4;

The accompanying drawings form a part of this specification and are incorporated herein. It may be noted that like parts appearing in various views of the drawings bear like reference numerals.

Figure 5C:
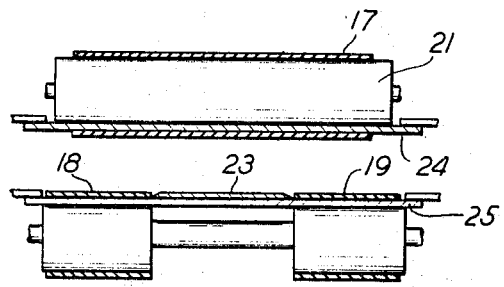
FIG. 5c is an elevation view in section of the compressor conveyor portion of the apparatus of FIG. 1, taken along a line perpendicular to the direction of movement of the conveyor.

With reference now to FIG. 1 of the drawings, apparatus is illustrated for baling flexible resilient bags 10 which are of the type used to package rice or similar grain products or the like. For example, the bags 10 may be composed of flexible plastic, usually polyethylene, filled with rice for bulk or consumer use, ordinarily the bags being of two pound size. The machine which will be described is designed to place thirty of these two pound bags into a paper baler bag for shipping, although it will be understood that this specific size and number is not material to the invention. The rice bags 10 are deposited onto a bag transfer slide or chute 11, preferably Teflon coated, which receives the bags from a form and fill machine wherein the bags are filled with rice or other product and sealed. The bags first strike a bag stop 12 which tilts and deposits the bags onto a discharge conveyor 13 which is moving to the right. From the discharge conveyor the bags are fed onto an inclined roller conveyor 14 which functions as a bag accumulator and bag straightener. A counter balanced or spring biased conveyor roller 15 protrudes upward above the remaining rollers and is counter weighted so that it requires the weight of two or three rice bags to depress it and allow the bags to pass over. This functions to straighten the bags if they have shifted position after leaving the tilt table 12. From the conveyor 14 the bags are deposited onto a receiving area 16 for a compressor conveyor arrangement including an upper conveyor belt 17 and a pair of lower conveyor belts 18 and 19 which are spaced apart as will be explained. The bags 10 pass between the upper conveyor 17 and the lower conveyors 18 and 19 which function to flatten the rice bags and also serve as a driving or pushing force to inject the rice bags into the hopper 20 as will be described. The conveyor belts 17–19 are powered by rollers 21 and 22, and the vertical spacing between the compressors may be adjusted to accommodate different sizes of bags. In passing through the compression conveyor, the bags actually ride on a slide plate 23 which supports the bags while they are pushed along by the movement of the conveyors, and the belts are held in a firm position a set distance apart by top and bottom compression plates 24 and 25.

The compression conveyor delivers the bags into the hopper 20 which basically consists of a frame 26 having a plurality of shelves 27 to provide five slots 28 corresponding to the five layers of rice bags to be placed in the bale. A bag guide 29 is positioned between ends of the compressor conveyor belts 17–19 and the front edge of the slots 28 of the hopper 20 to guide the bags into the particular one of the slots into which bags are to be fed. The hopper 20 is mounted in a bearing frame 30 which is moved vertically along guide shafts 31 to position the proper one of the slots 28 of the hopper 20 to receive the bags. The frame 30 bearing the hopper 20 is moved along the guides under power of three air cylinders 32, 33, and 34 as will be described. The hopper 20 moves down in five distinct steps so that the bags are discharged sequentially into the five slots 28, six bags being discharged into each slot. A counter is provided for counting the bags as explained below.

The hopper 20 is pivotally mounted by pivots 35 onto the top of a travel car 36 which may move horizontally along a path established by guides 37 in which cam followers 38 ride. The travel car 36 is moved backward and forward by an air cylinder 39 connected to the travel car by a mechanical linkage (described in detail with reference to FIG. 5a). The hopper frame 26 is held in the upright position by a lock lever 40, seen in FIG. 2, which is latched over a detent on one of the pivot brackets 35. The lock lever is pivotally mounted on the travel car 36 by a bracket 41, and the lock lever is operated by an air cylinder 42 having a shaft 43 which strikes the rear end of the lock lever to unlatch it from the detent on the hopper frame, permitting the hopper frame to rotate.

The hopper includes an extended horizontal shelf portion 45 attached rigidly to the hopper frame 26 and functioning to support the rice bags until the entire bale is filled. Flexible plastic sleeves 46, preferably Teflon, may be attached to the hopper frame to guide the rice bags and to permit them to slide readily across one another. One of these sleeves 46 would be provided for each of these slots 28. A large paper baler bag 50 is placed over the hopper shelf 45 around the plastic sleeves 46 and secured to the hopper frame 26 by a pair of air clamps 51 operated by air cylinders and mounted on the sides of the hopper frame. The air clamps 51 catch the baler bag between clamp members 53 and a metal side portion 54 of the hopper shelf 45.

When six rice bags have been inserted into each of the five layers as defined by the slots 28 in the hopper 20, the hopper is released by the lock lever 40 while the travel car 36 is in the forward position, and the entire assembly of the hopper frame and bale is permitted to fall free by gravity, rotating as seen in FIG. 3 to place the bale in a vertical position. When the lock lever 40 is released, the air clamp 51 is also released under control of the electrical circuitry, as will described, so that when the hopper shelf 45 reaches the vertical position the bale 47 containing the thirty rice bags will fall freely down to a receiving position. It is noted that the length of the bag or bale 47 is such that when the bale falls to the floor or receiving area, and the hopper moves back up to the upper position, the top of the bale will clear the end of the shelf 45 so that the hopper may be rotated back up to the original position either before or after the bale 47 is removed from the receiving area by hand or by conveyor. The hopper is moved back up to the vertical position either manually or by a suitable power mechanism, not shown. The filled bale is of such shape that it will stand free without support. The operation of the hopper including five downward steps then the rotating and release stop is depicted schematically in FIG. 3.

Referring now to FIGS. 4 and 5 of the drawings, the hopper section of the bag baler of the invention will be considered in more detail. It is noted that the hopper frame 26 has the shelf 45 and its sidewalls 54, which are usually composed of stainless steel, mounted therein and extending through to the bag guide 29 to provide a smooth path for the bags 10. The air clamp 51 (or air clamps if two are used) is mounted on the side of the hopper frame in a position such that it clears the bearing frame 30 when the hopper frame is in the upright position, it being noted that the hopper frame is positioned within the bearing frame. The pivot numbers 35 on the bottom of the hopper frame are connected to pivot brackets 56 by pivot pins 57, with a detent 58 being provided on one of the pivot numbers 35 for engaging the lock lever 40. The lock lever is mounted on a pivot bracket 59 on the rear of the travel car 36, and an extended end portion 60 of the lock lever is positioned to engage a portion of the mounting frame for the compressor conveyor to hold the lock lever in a lock position so long as the travel car is in the rear position. Also the end portion 60 is positioned to be engaged by the shaft 43 for the lock lever release air cylinder 42 when the shaft is driven to the upper position. The air cylinder 39 for driving the travel car 36 along the guides 37 is suitably mounted by a bracket 61 at one end while a shaft 62 engages a pivoted connection to a bracket 63 which is connected to the front top surface of the travel car 36.

The bearing frame 30 is slidably mounted on the guide shafts 31 and may move from a lower limit position determined by brackets 64 to an upper position high enough such that the output of the compressor conveyor discharges into the lowermost slot 28. The bearing frame 30 is resting in the lowermost position when the uppermost slot 28 is being filled and also when the hopper frame 26 rotates to the horizontal position to discharge the bale. A ball bearing assembly 65 may be provided for permitting the bearing frame to slide vertically along the guide shafts. Motive power for the bearing frame 30 is provided by the cylinders 32–34, it being noted that the cylinder 32 has one end mounted directly onto the bottom portion of the frame 30. The cylinder 33 and the cylinder 34 both have one end mounted onto a guide plate 66 which is free to slide vertically up and down on the guide shafts 31. A shaft 67 for the lower cylinder 34 engages a plate 68 at the lower part of the frame so that when compressed air is forced into the cylinder the shaft 67 will be driven by the piston to cause the guide plate 66 and the remainder of the assembly to move upward. Likewise, when either or both of the air cylinders 32 and 33 are energized, shafts 69 and 70, which are coupled together at their ends by a connector 71, may be forced to their extended positions and thus further adjust the height of the bearing frame 33. It is noted that the cylinders 32 and 33 are shorter than the cylinder 34, actually the cylinders 32 and 33 result in only half the distance of movement as the cylinder 34 so that five distinct positions are available corresponding to the five slots 28, but using only three cylinders. It is of course preferable that the air cylinders be driven from fully retracted to fully extended positions rather than to intermediate positions, so that more positive operation is provided. Thus the lengths of the shafts 67, 69 and 70 along with the sizes of the air cylinders 32–34 and the lengths of piston travel therein, are correlated with the heights of the slots 28 so that the slots will be exactly positioned to correspond to the opening in the bag guide 29 to permit free movement of the bags therethrough. If desired, however, limit switches are provided to sense the retracted and extended positions of each of the cylinders 32–34 for use as safety interlocks in the electrical control circuitry.

The assembly thus far described is adjustable for various bag sizes by a mechanism (not shown) for mounting the conveyor rollers, and also guide plates on the sides of the conveyors as well as the big guide 29 may be changed for different bags sizes. The hopper may be interchanged for this purposes, and if the height is different the air cylinders must also be adjusted.

Wiring diagrams for the control circuitry used to operate the apparatus will not be disclosed herein as the circuitry is of conventional form. However, it may be noted that suitable controls are provided which produce functions such as will be briefly outlined. The motor driving the compressor conveyors 17–19 is stopped whenever the travel car 36 is in the out position, or when the hopper frame 26 is in the down position, while the conveyor is also stopped if the air cylinders 32–34 are not in the proper fully-extended or fully retracted positions as determined by the program. A scale of six counter is provided for counting the bags passing through the bag guide 29 into the slots 28 of the hopper. A limit switch 72 as seen in FIGS. 2 or 5 may be used as the input to this counter, or of course other detector devices such as photoelectric cells could be used for this purpose. The limit switch 72 or other counting device produces an electrical pulse each time a bag 10 passes through the bag guide; these pulses are registered, and when six have passed through the conveyor is stopped. Indeed, since the limit switch is located at the beginning of the bag guide, a delay is introduced such that the conveyor stops a short period after the sixth bag has gone through the bag guide into the hopper. Then, a solenoid valve is opened to admit air cylinder 39 to move the travel car 36 and the hopper 20 forward. At the same time, the proper solenoid valves are operated to retract or extend the shafts of the air cylinders 32–39 to position the hopper. Circuitry is provided for sensing when the fifth count of six has been reached, i.e. the uppermost layer is full, to cause the conveyor to stop, the air cylinder 39 to be actuated to move the shaft 62 and the travel car 36 forward, the air cylinder 42 to be actuated to move the shaft 43 up to trip the lock lever extension 60 and move the lock lever 40 away from detent 58. Now the weight of the filled bale 47 will cause the hopper to fall to the release position, and solenoids controlling the admission of air to the air clamps will be operated to cause the air clamps to release. The conveyor motor cannot be restarted until the hopper has been restored to the upright position with a bale in place and the air clamps in the hold position, the circuitry being actuated by manual push button or other control to cause the admission of air to all of the cylinders 32–34 to move the hopper to its uppermost position before the cycle is restarted. The lock lever 40 must be in the lock position, and the travel car 36 in the rear position, these functions being sensed by limit switches, before the cycle can be restarted. Circuitry for providing these functions is readily at hand for persons skilled in the art and will not be explained in further detail.

Figure 6:
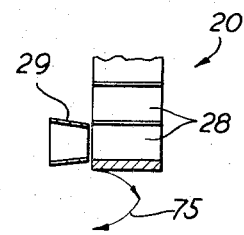
FIG. 6 is a schematic illustration of a portion of the hopper unit, showing the path of movement of the hopper in changing layers.

Referring to FIG. 6, the path of travel of the hopper when changing levels or layers is illustrated as a dotted line 75. The cylinder 39 moves the hopper along with the travel car 36 outward about 1½" at the same time that one of the cylinders 32–34 moves the hopper down about 2" or the height of one of the slots 28. The cylinder 39 must move its shaft out and in during the same time that the cylinder 32–34 moves the hopper down 2". The hopper must be moved outward while it is being moved downward to change layers so that the hopper will clear the bag guide 29, and also so that if one of the plastic bags 10 is protruding partly outward from one of the slots 28 in the hopper it will not be torn by the edges of the bag guide 29.

Figure 7:
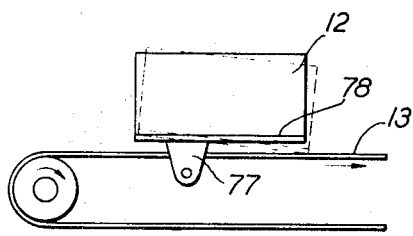
FIG. 7 is a schematic view of the tilt table portion of the delivery section of the apparatus of FIG. 1.

Referring to FIG. 7, a detailed view of the tilt table 12 is shown. The tilt table is pivotally mounted off center by a bracket 77 free to rotate about a fixed shaft. When a bag 10 is deposited onto the horizontal portion 78 of the table, striking the back plate, the weight of the bag will tilt the table permitting the bag to slide off onto the moving conveyor 13, the top of the table being Teflon coated to permit the bag to move freely. The back plate of the tilt table serves to align one end of the bag and positions the bag in the center conveyor 13, while the action of tilting permitting the bag to be picked up by the conveyor 13 also functions to properly align the bag.

Figure 8:
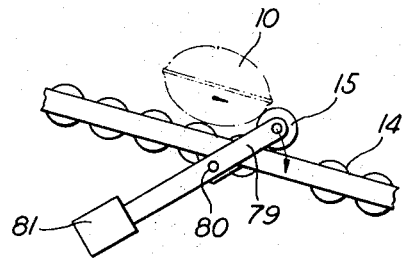
FIG. 8 is a detailed view in schematic form of the bag straightener device used in the delivery section of the apparatus of FIG. 1.

FIG. 8 shows a more detailed view of the inclined roller conveyor 14 including the bag straightener device 15 which it is noted is mounted on an arm 79 pivoted at a point 80 and counter weighted with a weight 81 so that the roller 15 will be held in the upper position to stop the bags until two or three of the bags force the roller 15 downward. This bag straightener arrangement is of course not critical to operation of the hopper according to the invention so long as the bags are properly aligned, but is noted here as a significant feature for use with this type of equipment in general.

The operation of the bag baler apparatus of the invention will now be described, reference being made preferably to FIG. 1 of the drawings. Initially the bearing frame 30 will be in the uppermost position so that the lower slot 28 in the hopper 20 is aligned with the bag guide 29. The hopper frame 26 will be in and locked with the lock lever 40, the travel car 36 being in the inner or rearward position. A baler bag 47 will have been placed onto the hopper and the air clamps 51 in the hold position. The air cylinders 32–34 will all be in their extended positions, while the cylinder 39 will be in its retracted position. The compressor conveyor is started, and bags flow through the compressor section into the bag guide 29 and are counted as they pass through the lowermost slot 28 of the hopper and on into the lowermost one of the sleeves 46 to rest on the shelf 45. When six bags have entered the hopper the compressor conveyor stops, air is admitted to the cylinder 39 to force its shaft to the extended position, air is admitted to the cylinder 32 to force it to the retracted position and move the hopper down one layer to the next slot 28 (according to the path 75 in FIG. 6) and then air is forced into the cylinder 39 to retract it, positioning the hopper to receive the next layer of bags. The return of the hopper 30 to the rear position actuates a limit switch which causes the compressor conveyor to again start and bags are fed into the second layer. When six bags have been counted the conveyor stops, cylinder 39 is cycled while air cylinder 33 is retracted so that the middle or third one of the slots 28 is positioned in front of the bag guide. The cycle is repeated with the compressor conveyor started to deliver six more bags, then the conveyor stopped and the cylinder 39 cycled to extended and retracted positions while compressed air control valves will be operated to cause the cylinder 34 to be retracted and the cylinder 33 extended, resulting in a net 2″ downward movement of the hopper to position the number four layer or the next to highest one of the slots 28 in front of the bag guide 29. As noted above, the cylinder 34 is twice as long as the cylinders 32 and 33, providing this five-step vertical adjustment. The conveyor will be started and six bags delivered into this layer, and the cycle repeated whereupon the conveyor is stopped, the cylinder 39 extended and retracted while the cylinder 33 is retracted, placing the hopper in the lowermost position. The conveyor is restarted to fill up the top layer with six bags, then the conveyor is stopped. At this point the cylinder 42 is operated to unlock the lock lever 40, after the cylinder 39 is moved to the extended position and the travel car moved out, thus permitting the hopper 20 to rotate forward about the pivots 35 until the hopper frame is in a horizontal position. Simultaneously the air clamp 51 will be retracted so that the loaded baler bag 47 will fall to the floor or receiving area. Immediately the cylinders 32, 33 and 34 are actuated and thus forced to their extended positions so that the hopper will be raised above the filled baler bag 47 and bag may be removed, this operation being illustrated in FIG. 3. Manually, or automatically if provision is made for this operation, another baler bag 47 is slipped over the hopper and the air clamps 51 energized, then the hopper is manually raised to the position wherein the frame 26 is vertical and the shelf 45 is horizontal, and the lock cylinder 42 is actuated so that the lock lever 40 engages the detent on the pivot member 85. The hopper is now in place and the machine is ready for a new cycle for filling the layers of the new baler bag. In the embodiment illustrated the new cycle would be initiated by manually actuating a push button switch which initiates a new cycle of the program as just described.

Figure 9:
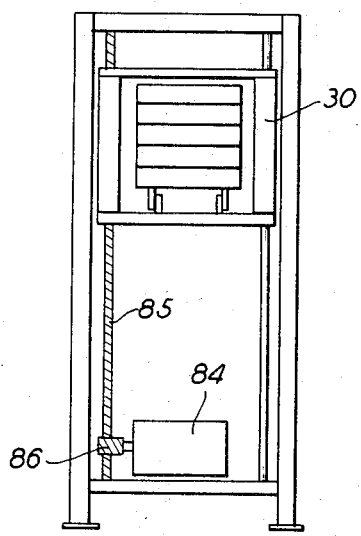
FIG. 9 is an elevation view similar to FIG. 4 of another embodiment of the invention.
Figure 10:
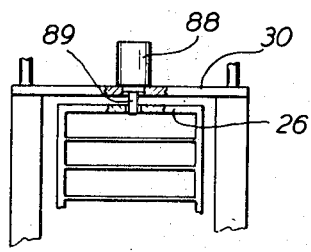
FIG. 10 is a detailed view of a portion of the apparatus of FIG. 1 at the top of the hopper illustrating another embodiment of the invention.

It may be noted that other mechanisms for raising and lowering the hopper bearing frame 30 may be utilized. For example, as seen in FIG. 9, an electric motor 84 along with a worm 85 and gear 86 may be employed along with appropriate limit switches for starting and stopping the motor when the hopper frame is in the correct positions adjacent the bag guide. Also a hydraulic drive mechanism could be used similar to the pneumatic arrangements which have been described. However, electric or hydraulic drive mechanisms usually are not as quick acting as the air cylinders and pistons depicted above as the motive power mechanisms. Accordingly, the fast-acting feature, as well as the clean and relatively oil or grease free nature of the air cylinder arrangement is preferable. In a like manner, other locking mechanisms may be used in place of the locking lever arrangement shown, such as a solenoid 88 operating a bolt 89 engaging a slot in the upper edge of the hopper frame 26 as seen in the fragmentary view of FIG. 10. The air cylinder arrangement is again preferred because of its clean, positive and trouble free operation. It may also be noted that the shelves 27 may extend the length of the shelf 45 rather than using the plastic sleeves 46, although the described arrangement is preferred since these extended shelves may interfere with the filled bales sliding away from the hopper arrangement.

Accordingly, while the invention has been described with reference to preferred embodiments, it will be understood that the description is not to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

What is claimed is:

1. Apparatus for packaging articles in a plurality of layers, with each layer including a plurality of such articles, comprising:
    a hopper having a plurality of slots corresponding to such plurality of layers, one end of the hopper adapted to receive a package for said articles, the slots in the hopper functioning to guide the articles into the package.
    means for delivering articles to be packaged to the other side of the hopper into the slots,
    means for providing relative movement between the hopper and the means for delivering in a sequence of steps whereby the articles are delivered to such slots in sqeunce,
    means for detecting and counting the articles delivered into the hopper, and means responsive to the counted number 'for vertically moving the hopper relative to the means for delivery in a pattern of steps in sequence to provide the plurality of layers of articles, a predetermined number of such articles being provided in each layer,
    the hopper being pivotally mounted at one end thereof to a movable member, and means are provided for shifting the movable member from a position closely adjacent the means for delivery while the articles are being delivered into the package, and to a position spaced from the means for delivery when the hopper is filled.

2. Apparatus for packaging aritcles according to claim 1 wherein means are provided for lacking the hopper in a generally vertical position while the hopper is being filled, and for permitting the hopper to rotate to a generally horizontal position when the package contains a desired number of said articles, the hopper being vertically positioned after release of the package to facilitate removal of the package from the area of the hopper.

3. Apparatus for packaging articles according to claim 2 wherein a plurality of air-operated piston and cylinder assemblies is utilized for vertically moving the hopper in the sequence of steps in response to the counted articles, and wherein said movable member is moved by an air-operated piston and cylinder arrangement.

4. Apparatus for packaging articles in a plurality of layers, with each layer including a plurality of such articles, comprising:
    a hopper having a plurality of apertures corresponding to said plurality of layers, one side of the hopper being adapted to receive a package for such articles, the apertures in the hopper functioning to guide the articles into the package,
    means for delivering articles to be packaged to the other side of the hopper into said apertures in a sequential pattern, the articles moving in a generally horizontal path into the package with the hopper being positioned generally vertically,
    the hopper being rotated to a generally horizontal position when the package contains a desired number of said articles, the package being released from the hopper while the hopper is in such generally horizontal position, the hopper being pivotally mounted at one end thereof to a movable member, the movable member being positioned adjacent the means for delivering while the articles are being delivered into the package and being positioned spaced from the means for delivering when the hopper is rotated for release of the package.

5. Apparatus for packaging articles according to claim 4 wherein the assembly of the hopper and movable member is vertically movable relative to the means for delivery in a pattern of steps whereby the articles are delivered to said apertures in sequence to provide the plurality of layers in the package.

6. Apparatus for packaging articles according to claim 5 wherein means are provided for vertically moving the assembly including the hopper and movable member and means are provided for counting the articles delivered into each layer whereby the vertically moving means is actuated after a predetermined number of articles are delivered into each layer.

7. Apparatus for packaging articles according to claim 6 wherein the articles to be packaged are in the form of flexible and deformable sacks of fluent material, and wherein the means for delivery includes a pair of opposing conveyors spaced from one another to form the sacks into the desired height corresponding to said slots in the hopper.

8. Apparatus for packaging articles according to claim 7 wherein the means for vertically moving the assembly of the hopper and movable member includes a plurality of air-operated piston and cylinder arrangements, and wherein the movable member is moved by an air-operated cylinder.

9. Apparatus according to claim 7 wherein the sacks of fluent material are delivered to the conveyors by an inclined roller conveyor having a counterbalanced roller extending upwardly therefrom and functioning to retard the sacks in a manner sufficient to straighten the sacks transversely along their path of movement.

10. Apparatus for packaging articles in a plurality of layers, with each layer including a plurality of such articles comprising:

a hopper having a plurality of apertures corresponding to said plurality of layers, one side of the hopper being adapted to receive a package for such articles, the apertures in the hopper functioning to guide the articles into the package.

means for delivering articles to be packaged to the other side of the hopper into said apertures in a sequential pattern, the articles moving in a generally horizontal path into the package with the hopper being positioned generally vertically, the hopper being rotated to a generally horizontal position when the package contains a desired number of said articles, the package being released from the hopper while the hopper is in such generally horizontal position, the articles to be packaged being in the form of units of flexible and deformable fluent material, and the means for delivering articles to be packaged includes a slide for delivering the units to a conveyor, a tilt table being positioned to receive the units from the slide and deposit the units on the conveyor whereby movement of the conveyor with respect to the slide does not displace the units transversely.

References Cited
UNITED STATES PATENTS

| | | | |
|---|---|---|---|
| 1,942,555 | 1/1934 | Kimball et al. | 53—162 X |
| 2,047,272 | 7/1936 | Kimball et al. | 53—164 X |
| 2,952,955 | 9/1960 | Leichenich et al. | 53—61 |
| 3,046,712 | 7/1962 | Carter | 53—162 |
| 3,270,485 | 9/1966 | Knepper | 53—255 |

THERON E. CONDON, Primary Examiner

R. L. SPRUILL, Assistant Examiner

U.S. Cl. X.R.

53—153, 159, 255